United States Patent [19]

Slawson

[11] 4,314,330
[45] * Feb. 2, 1982

[54] MACHINE TOOL DATA SYSTEM

[75] Inventor: Kenneth L. Slawson, Depew, N.Y.

[73] Assignee: Houdaille Industries, Inc., Ft. Lauderdale, Fla.

[ * ] Notice: The portion of the term of this patent subsequent to Jun. 11, 1991, has been disclaimed.

[21] Appl. No.: 14,582

[22] Filed: Feb. 23, 1979

Related U.S. Application Data

[60] Division of Ser. No. 421,103, Dec. 3, 1973, Pat. No. 4,150,427, which is a division of Ser. No. 150,637, Jun. 7, 1971, Pat. No. 3,816,723, which is a continuation-in-part of Ser. No. 744,392, Jul. 12, 1968, Pat. No. 3,634,662, which is a continuation-in-part of Ser. No. 652,968, Jul. 12, 1967, abandoned.

[51] Int. Cl.$^3$ .................. G06F 15/46; B23Q 21/00; G05B 19/42
[52] U.S. Cl. .................. 364/192; 318/570; 364/191; 364/171
[58] Field of Search ............... 364/107, 474, 475, 110, 364/111, 113, 300, 200 MS File; 318/594, 596, 570, 572, 573, 574, 568, 601, 569

[56] References Cited

U.S. PATENT DOCUMENTS

| 3,355,714 | 11/1967 | Culler | 364/200 |
|---|---|---|---|
| 3,465,298 | 9/1969 | La Duke et al. | 364/200 |
| 3,546,559 | 12/1970 | Kosem | 318/594 |
| 3,555,254 | 1/1971 | Gerber | 364/113 |
| 3,559,179 | 8/1967 | Rhoades | 364/200 |
| 3,562,715 | 2/1971 | Bishop et al. | 364/107 |
| 3,579,192 | 5/1971 | Rasche et al. | 364/200 |

FOREIGN PATENT DOCUMENTS

| 786486 | 5/1968 | Canada | 364/107 |
|---|---|---|---|
| 1494849 | 8/1967 | France | 364/107 |

OTHER PUBLICATIONS

Digital Equipment Co., PDP-8, High Speed Digital Computer, 1965.
Digital Equipment Co., Digital Control Handbook C-110, 1968, pp. 201, 202.
Digital Equipment Co., Control Handbook-Tape Preparation, pp. 339-345, 1971.
Kosem: Hardwired Numerical Controllers Yield to Efficient Minicomputers Electronics, Apr. 12, 1973.

Primary Examiner—Felix D. Gruber
Attorney, Agent, or Firm—Hill, Van Santen, Steadman, Chiara & Simpson

[57] ABSTRACT

A machine tool data system for receiving and storing abbreviated instructions representing blocks of machine tool control data and including pattern type instructions such as copy, mirror image and tool change each involving a series of such blocks, the computer responding to editing instructions such as insert or delete as to specified lines of stored instructions or computing the blocks represented by the stored instructions for transmission to an output device such as a tape punch, the computer generating the blocks of a pattern type series at the rate of utilization of said blocks by the output device. A machine tool may be connected on line and controlled by the computer simultaneously with the editing or tape preparation operations thereof, and the machine tool may be controlled manually from a data terminal on line with the computer when the terminal is not in use for tape preparation.

28 Claims, 2 Drawing Figures

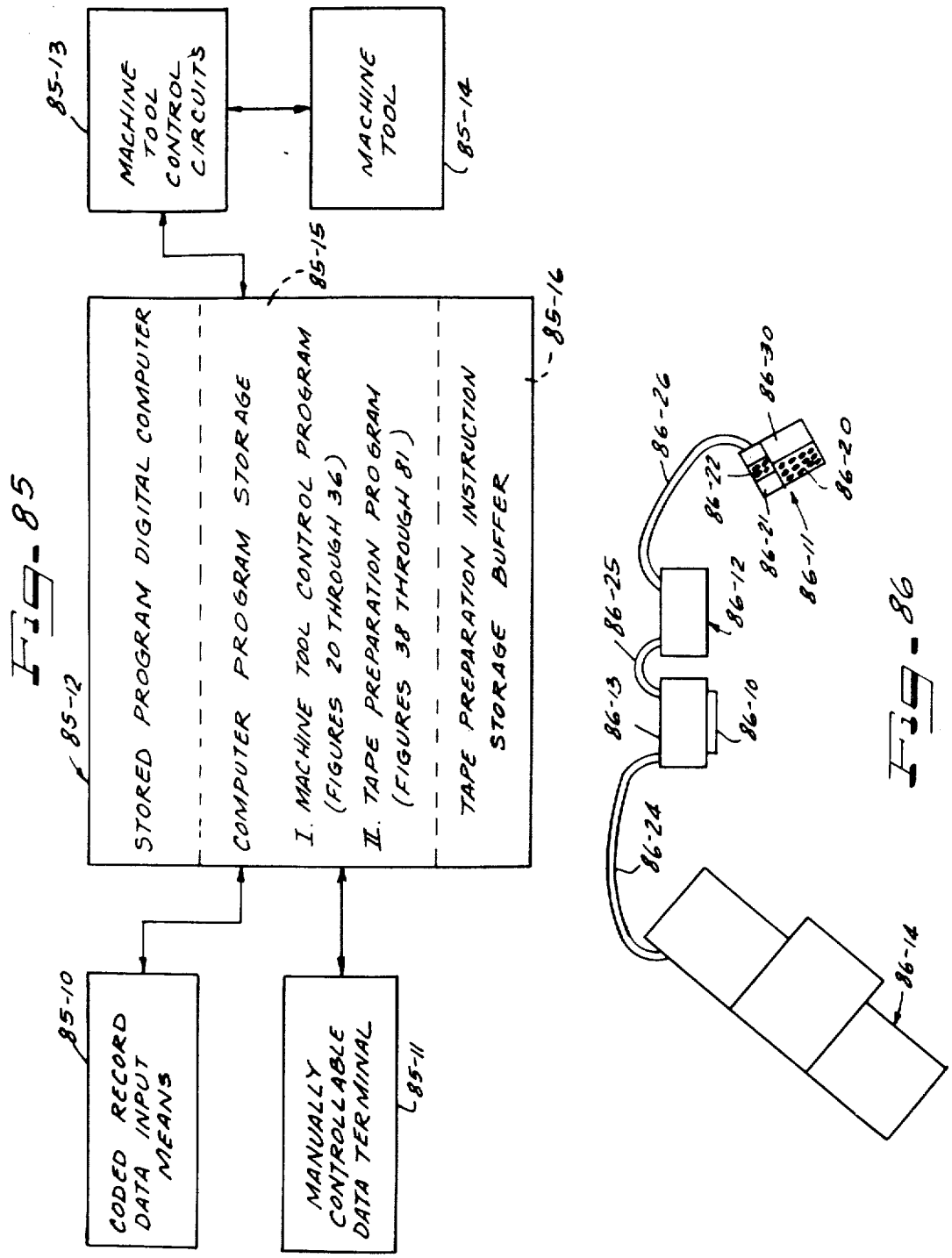

MACHINE TOOL DATA SYSTEM

CROSS-REFERENCES TO RELATED APPLICATIONS

The present application is a division of my copending application Ser. No. 421,103 filed Dec. 3, 1973, now U.S. Pat. No. 4,150,427 which is a division of my application Ser. No. 150,637 filed June 7, 1971 (now U.S. Pat. No. 3,816,723 issued June 11, 1974), and said application Ser. No. 150,637 in turn is a continuation in part of my application U.S. Ser. No. 744,392 filed July 12, 1968 (now U.S. Pat. No. 3,634,662 issued Jan. 11, 1972), which in turn is a continuation in part of my prior application U.S. Ser. No. 652,968 filed July 12, 1967 (now abandoned).

Said application Ser. No. 150,637 also referred pursuant to 35 USC 120 to my applications U.S. Ser. No. 122,550 filed Mar. 9, 1971 (now U.S. Pat. No. 3,689,821 issued Sept. 5, 1972), and U.S. Ser. No. 831,131 filed June 6, 1969 (now U.S. Pat. No. 3,629,560 issued Dec. 21, 1971) and to my prior application Ser. No. 681,776 filed Nov. 9, 1967 (abandoned in favor of the continuation application Ser. No. 122,550).

Each of the above applications is hereby incorporated by reference herein.

SUMMARY OF THE INVENTION

A basic objective of the present invention is to provide a substantially more flexible machine tool control system capable of producing desired machine operations from basic data such as parts blueprints or the like with a substantially reduced overall expenditure of time and effort.

A further object of the invention is to provide such a machine tool control system and method which is competitive in cost with existing machine tool control systems.

Another basic objective is to provide a machine tool control system of substantially greater flexibility and throughput efficiency and yet which is of cost justifying its immediate introduction in job shops and other diversified parts production facilities.

A further object of the invention is to provide a machine tool control system and method capable of generating a coded record for a machine tool in response to both incremental and absolute input data in any desired order.

It is also an object of the present invention to provide a method and apparatus for compensating control systems for errors due to manufacturing tolerances wherein each individual control can be simply and economically adapted to adjust for a specific pattern of mechanical errors.

Still another and further object of the present invention is to provide a control system capable of automatically determining its own current operating characteristics at desired intervals and for thereafter taking into account any changes in such operating characteristics in executing future commands to the system.

A still further object of the invention resides in the provision of a numerical control system and method enabling the changing of input commands to correct for previous minor positioning errors and/or mechanical tolerance errors so as to provide improved overall accuracy.

Still another object of the invention is to provide a numerical control system and method with provision for substantially expediting the generation of new numerical control programs.

Yet another object of the invention is to provide a system and method for facilitating the generation of machine positioning numerical control programs.

Another and further object of the invention is to provide a numerical control system and method capable of simultaneously controlling the operation of one or more machine tools and/or of assisting in the generation of new numerical control positioning programs for future use in controlling machine tools.

Still another and further object is to provide such a system capable of controlling the operation of a plurality of machine tools and simultaneously providing a stored program digital computer facility available for simultaneous program generation.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

INCORPORATION BY REFERENCE

For a complete disclosure of my invention including the drawings FIGS. 1-84 and the description thereof, reference is made to U.S. Pat. No. 3,634,662. The Specification of said patent (patent application Ser. No. 744,392 filed July 12, 1968) is hereby incorporated by reference and made a part hereof.

BRIEF DESCRIPTION OF THE DRAWINGS

FIGS. 1-84 are briefly described in U.S. Pat. No. 3,634,662 referenced above, at column 2, line 1 through column 3, line 40.

FIG. 85 is an overall block diagram of a machine tool system in accordance with the present invention; and FIG. 86 shows a physical layout of the components of a commercial system in accordance with FIG. 85 located adjacent one another on a factory floor.

DESCRIPTION OF THE ACCOMPANYING DRAWINGS

Referring to FIG. 85, there is indicated diagrammatically an overall system in accordance with the present invention including a coded record data input means 85-10, a manually controllable data terminal 85-11, a stored program digital computer 85-12, a machine tool control circuits component 85-13 and a machine tool 85-14. The computer component 85-12 has been indicated as including from a functional standpoint a computer memory including a section for computer program storage indicated at 85-15 and a section 85-16 serving as a storage buffer for tape preparation instructions.

FIG. 86 illustrates a corresponding layout of physical components for a commercial system in accordance with the embodiment of FIG. 85 and including a high speed tape reader 86-10, a typewriter console 86-11, a stored program digital computer 86-12, a machine tool control module 86-13 and a punch press 86-14. The console 86-11 may include a conventional keyboard 86-20, a conventional low speed tape reader and tape punch assembly 86-21 and a manual control panel 86-22 for control of the assembly 86-21 and its communication with the computer 86-12. The various components are shown as being interconnected by means of cables 86-24, 86-25 and 86-26.

The keyboard 86-20 constitutes an example of an input device operable to produce coded input signals or instructions representing blocks of machine tool control data including certain pattern type coded input signals or instructions each representing a series of blocks of machine tool control data. The tape punch of assembly 86-21 and the typewriter of console 86-11 are examples of output devices responsive to respective blocks of machine tool control data from the computer 86-12 to produce respective output operations, such as the punching of suitable machine tool control codes on a paper tape associated with the punch of assembly 86-21, or the printout of the blocks of machine tool control data by means of the typewriter. The stored program digital computer as represented at 85-12 in FIG. 85 or at 86-12 in FIG. 86 is operably connectable on line with the coded record data input means 85-10 or the high speed tape reader 86-10, for example, to receive successive blocks of machine tool control data and to compute under the control of the machine tool control program (indicated as program I in section 85-15 of component 85-12) corresponding blocks of machine tool displacement commands and to transmit the same to the machine tool control circuits 85-13 for execution by the machine tool 85-14. In a "TYPE" mode, machine tool control instructions may be manually transmitted from data terminal 85-11 to the computer for on line control of the machine tool 85-14 under direct supervision of an operator. The machine tool control program I under these circumstances is operable to respond to the machine tool control instructions and to generate the corresponding blocks of machine tool control data for transmission to the circuits component 85-13.

In a tape preparation mode, an operator may utilize terminal 85-11 to develop a new coded record for control of the machine tool 85-14, the operator utilizing an input device such as keyboard 86-20 connected on line with the computer 86-12 to produce coded input signals in the form of lines of successive instructions representing blocks of machine tool control data including certain pattern type coded input signals such as "copy", "mirror image" and "tool change" each involving a series of blocks of machine tool control data. The computer includes a tape preparation program indentified as program II in section 85-15 of FIG. 85 for controlling the computer in the tape preparation mode. The computer also includes, for example as part of its core memory, the storage buffer 85-16 for the tape preparation instructions transmitted to the computer by the input device such as indicated at 85-11 The computer may operate on a time sharing basis in controlling the machine tool in response to a coded record at input means 85-10 and in assisting the preparation of a new coded record tape in on line association with data terminal 85-11. The computer under the control of the tape preparation program is responsive to editing instructions from data terminal 85-11 such as "insert" or "delete" as to specified lines of instructions in the storage buffer 85-16. As part of the computer operation in tape preparation mode, the computer is connectable on line with the tape punch or typewriter of console 86-11, for example, and is operable under the control tape preparation program to retrieve the successive instructions in the storage buffer 85-16 and to compute the corresponding blocks of machine tool control data for supply character by character to the tape punch, for example.

In retrieving a pattern type instruction from the storage buffer 85-16, the computer calculates a first block of machine tool control data and transmits the same to the tape punch, for example, acting as an output device, the computer timing the computation of the succeeding blocks of the series of blocks represented by the pattern type instruction in accordance with the rate of response of the output device such as the tape punch so that it is unnecessary for the computer internal memory to store any substantial number of the blocks of the series of blocks represented by the pattern type instruction. As an example, in section 1.10 (EXAMPLE OF PIECE PART PROGRAMMING) incorporated herein by reference there is illustrated a line of instruction identified as reference block number 0011, which results in the generation by the computer of blocks of machine tool control data identified as block numbers 0011 through 0019. By storing only the instruction line, and by calculating the blocks of machine tool control data concurrently with their transmission to the output device, very substantial reductions in the capacity of computer memory are achieved.

The components of FIGS. 85 and 86 may operate in any of the manners described in the applications referred to as related applications herein, and all such features of structure and operation are disclosed with reference to the components of FIGS. 85 and 86.

FIGS. 38–81

FIGS. 38–81 are flow diagrams illustrating the tape preparation program for a commercial system in accordance with the systems of FIG. 85 and 86, the detailed tape preparation program being set forth under the heading "Contents Of Computer Memory" beginning at column 42 of said U.S. Pat. No. 3,634,662.

In the following summaries references to section numbers designate sections of the "Excerpts From Operation Manual" found in the disclosure of the aforesaid U.S. Pat. No. 3,634,662.

SUMMARY OF FEATURES OF THE TAPE PREPARATION PROGRAM

In general, as will be apparent from section 1.10 the computer 85-12 operates under the control of its stored program II stored in computer memory 85-15 to respond to certain coded input signals received from an input device such as the manually operated input device 85-11. For example, where the input device includes a keyboard 86-20, the keyboard can be manually actuated to type the letter "S" standing for the "Start" command explained in section 1.8-1. The computer under the control of its stored program responds to the "start" or "initial" coded input signal so generated to print out "X Limit=". The operator then types on the keyboard the X dimension of the workpiece, for example "18." for the workpiece, of FIG. 19 having a dimension of 18 inches parallel to the X axis. The computer under the control of the stored program upon receipt of the X axis limit causes the typewriter 86-30 to print out "Y Limit=", whereupon the operator types in the Y dimension of the workpiece, for example "12." for the workpiece of FIG. 19 having a dimension of 12 inches parallel to the Y axis. As explained under section 1.8, "4. Diagnostics", the computer program provides for an "Overflow" print out to advise the operator that the last block contained an increment which cause the cumulative coordinates with respect to an initial reference point (such as REF. PT. "A" of FIG. 19) to be off the workpiece as defined by the aforesaid X Limit and Y Limit previously given by the operator.

Further, as explained under "2. Move Entries", a coded input signal of a pattern type may call for the generation of machine tool control data by the computer for carrying out an automatic tool change move. The computer in response to the typing of a symbol "T" signifying the automatic tool change, may utilize the Y limit in conjunction with an accumulated absolute displacement value representing the present work table position to compute an incremental displacement value required to shift the workpiece clear of the tool operating position. Thus, referring to section 1.10, the "T" coded input signal is shown as being generated in reference block number 0020. Referring to the workpiece of FIG. 19, it will be observed that the machine tool operating position is in alignment with REF. PT. "B" for block "19" corresponding to block number 0019. Since the accumulated Y axis displacement value is minus 6.000 for REF. PT. B in FIG. 19, and since tool change is to take place 2.5 inches off the workpiece, the computer will determine that an incremental move of 12.000 minus 6.000 plus 2.500 is required along the Y axis in order to move the workpiece to the required offset position. Thus block number 0020 requires an incremental X axis move of 0.000 and an incremental Y axis move of minus 8.500. The computer program will also generate suitable auxiliary function commands such as "S" meaning "Stop", "I" meaning "Inhibit Punch" and "D" meaning "Die Change". See the commands for block 0020.

Referring to FIG. 19, it will be observed that the larger diameter hole to be punched for block 21 is located at absolute displacement values relative to REF. PT. "A" of X equals 14. and Y equals minus 8. As seen in section 1.10 after the tool change operation of block 0020, the operator may enter the coordinates of the next position, whereupon the computer will determine the necessary incremental moves required to move the work table from the offset position indicated at "20" in FIG. 19. Thus, referring to the print out of block 0021 it will be observed that the computer has determined that incremental moves of X equal plus 5.000 and Y equals plus 6.500 will move the work table so that the workpiece of FIG. 19 has the large diameter hole of block number 21 disposed at the tool operating position. As indicated in one of the Notes of section 1.8 it is not necessary to program a "P" after a block that has an inhibit punch ("I"). Thus while the symbol "I" was automatically inserted by the computer for block 0020, the computer will automatically insert the punch command "P" for block 0021. Thus, in executing block number 0021, the computer would cause the machine tool control to move the work table five inches to the left and 6.5 inches in an outward direction so that location 21 of FIG. 19 would then be at the machine tool operating position, and whereupon the computer would cause a punch operation to be executed.

The response of the computer under the control of the stored program to other pattern type coded input signals is explained in sections 1.8, 1.10 and 2.4 of the present specification. These pattern type coded input signals include the following: C directing the computer to generate a series of new blocks corresponding to a series of previous blocks (see reference block number 0003); X meaning copy a specified series of previous blocks with the sign of the X axis displacement increments reversed; Y meaning copy a specified series of previous blocks with the sign of the Y axis increments reversed; and M meaning copy a specified series of blocks with both the X and Y increments reversed in sign. The C, X, Y and M commands are represented by blocks 0003 and 0011–0019. Thus, it will be observed that these pattern type coded input signals generate moves which are repetitions of or mirror images of the moves specified by a previous series of blocks. For example referring to FIG. 19, it will be observed that the movements to holes generated by blocks number 11, 12, 17 and 18 form a mirror image in relation to the holes of block numbers 8, 9, 14 and 15.

Referring to block number 0023, it will be noted that the blocks of machine tool control data generated by the input device can be placed on punched tape in response to the command "P" which is explained in section 1.8, paragraph No. 9. Thus, the computer under the control of the stored program will punch a tape in EIA code in accordance with the blocks such as listed in section 1.10.

As explained in section 2.5, the tape reader 86-10 may read successive blocks of information which are presented in the EIA format. As explained in section 2.1, in step mode of operation, the computer 86-12 is operable to read one block of information at a time while inhibiting the machine function so that this mode of operation can be used by the machine tool operator to verify the positioning of maching tool 86-14 without producing a piece part. As explained in section 2.4, under "Part and Program Verification" the machine tool operator may stop the piece part production at any point and examine the schematic diagram in comparison to the value displayed in the absolute value display counters such as 450, FIG. 4. Further, the standard machine tool program will allow the machine to punch any given part at its maximum speed, while at the same time the console typewriter 86-30 attached to the computer control will be printing out as fast as it can the positioning error for X and Y for each move of the piece part. Thus, when the piece part is finished and the typewriter has stopped printing, the machine operator will have a finished part and written record of the positioning accuracy of the machine tool.

Other important features of the tape preparation program are summarized in section 2.4 of the specification.

SUMMARY OF TAPE PREPARATION OPERATION

As explained in section 1.2 with respect to the "Console Typewriter Module" the computer console 86-11 includes not only the console typewriter 86-30 but also includes a tape punch or coded record producing device (part of 86-21) and a tape reader or coded record reading device (also part of 86-21). These components are distinct from the high speed tape reader 86-10 which has an interface shown in some detail in FIG. 10. The source of instructions 85-10 may be thought of as constituting the high speed tape reader 86-10 and interface and/or the coded record device of the Console Typewriter Module 86-11, since either coded record device may be utilized for transmitting successive blocks of machine tool control data to the computer accumulator register.

To read coded records into the computer memory, certain coded input signals are generated by the console typewriter 86-30 which serves as a manually controllable input device. Where the coded record is in EIA format the characters RE are generated by component 86-11 as explained in paragraph 11 of section 1.8, while if the coded record is in ASCII format, the characters RA are generated as described in paragraph number 12. As described in paragraph 12, as the blocks are transmitted to the computer, the computer under the control of its stored program will renumber the blocks as they are stored in the computer memory 85-16, starting with one.

It will be observed from section 1.8, that numerous commands can be transmitted to the computer from the console 86-11 by means of a single character-generating manual actuation of the input keyboard 86-20, exclusive of actuations of the keyboard to identify a series of blocks, or to identify a plurality of repetitions with respect to a series of blocks. Thus the characters S,E-,I,L,D, C, and so on, are all transmitted to the computer by means of a single character- generating manual actuation of the console keyboard.

As explained, for example, in section 1.8 with the exception of the coded insert signal represented by the character I, the computer under the control of the stored program will cause the console typewriter 86-30 to print out a block number before the entry of each successive data block. Thus, as indicated at the right hand column of the tabulation in section 1.10, after the "Start" operation, the computer will cause the console typewriter to print out "0001", signifying that the computer is now ready to receive the displacement type coded input signals such as "1.5" representing the incremental move with respect to the X axis. The console typewriter 86-30 thus includes a display device under the control of the computer for displaying the successive block numbers to which the computer will assign the next set of coded input signals from the console keyboard. As also indicated in section 1.10, the console typewriter 86-30 acting as a display device will print out the successive block numbers together with the associated machine tool function commands (such as P for punch) and incremental and absolute displacement values for the respective axes.

A more detailed summary of operation is found in section 2.

The copy command is an example of a pattern type coded input signal which may include a block identifying signal (the code characters N, M specifying block numbers N through M, inclusive) and which may include a repeat signal (the character X specifying a pattern type operation on the series of blocks X times). Other examples of pattern type coded input signals are the tool change signal (represented by the character T in data mode) and the mirror image coded input signals (X, Y and M). See also the software refinements given in the second paragraph under section 2.6.

The console typewriter module 86-11 provides both a manually operable keyboard 86-20 and a coded record device 86-21 for punching new tapes and for reading previously prepared tapes. The console typewriter is also indicated at 3703 in FIG. 37 and includes a manually operable line type character generator (for example the keyboard 86-20) for generating successive lines of coded input signals, the end of each line being signalled by actuation of the carriage return. The console typewriter module 3703 further includes a display device (provided by the print out capacity of the typewriter) which includes a display region where the successive characters generated in a single line operation of the character generator are displayed as a horizontal line on the display region.

See the example of actual block print out in section 1.10 of the disclosure of U.S. Pat. No. 3,634,662. It will be noted from reference block 0022 of section 1.10 that the typewriter 86-30 is operable to generate a displacement type coded input signal including a series of displacement values (e.g. minus 14. plus 9. minus 1.25 plus 5.) whose algebraic sum (equals minus 1.250) represents a coordinate value specifying a movement of the work table relative to one of the axes (e.g. the X axis as represented in FIG. 19). (Note the X coordinate value for the hole number 22 in FIG. 19.) It will be noted that a pattern type coded input signal (such as 4C2 at block 0003, application page 104) can be generated in a single line operation of the typewriter module 3703.

SYMBOLIC EXPLANATION OF TAPE PREPARATION PROGRAM

By way of supplement to the listing of the contents in computer memory section 85-15, found under the heading "Contents of Computer Memory" in U.S. Pat. No. 3,634,662.

Applicant directs attention to the tape preparation program which is illustrated in the flow diagrams of FIGS. 38-81. A symbolic explanation of the tape preparation program corresponding to the FIGS. 38-81 has been submitted as an Appendix A.

I claim as my invention:
1. In a computer system,
  (a) a manually controllable input device operable to produce coded input signals
     as manually selected by an operator and pertaining to successive blocks of new machine control data to be generated,
  (b) a stored program digital computer including a computer memory with memory locations for storing machine control data pertaining to positioning operations of a machine and containing a stored program, said digital computer under the control of said stored program being connected with said manually controllable input device and operable to respond to said coded input signals from said device to generate successive blocks of new machine control data in accordance with said coded input signals and expressing successive machine movements both as incremented displacement values relative to respective next preceding ones of said successive blocks and as absolute displacement values with respect to a common reference point.
2. In a computer system,
  (a) a manually controllable input device operable to produce coded input signals
     as manually selected by an operator pertaining to successive blocks of new machine control data to be generated,
  (b) said manually controllable input device being operable to produce coded input signals representing at least the following:
     (1) a plural digit decimal number representing a displacement value relative to one of a plurality of machine axes (2) a coded "list" input signal, (3) a coded "delete" input signal, and (4) a coded "copy" input signal, and
  (c) a stored program digital computer including a computer memory with memory locations for storing machine control data pertaining to the operation of a machine, said computer memory having a stored program therein, and said digital computer under the control of said stored program being responsive to said coded input signals to generate siad sucessive blocks of new machine control data in accordance therewith and to store said successive blocks of machine control data at said memory locations, said digital computer under the control of said stored program being operable: (1) to respond to said coded input signal representing a plural digit decimal number to generate a block of said new machine control data incorporating a displacement value relative to said one of a plurality of machine axes in accordance with said plural digit decimal number, (2) to respond to said coded "list" input signal to list all blocks of said machine control data in said memory locations, (3) to respond to said coded "delete" input signal to delete identified blocks of said machine control data from said memory locations, and (4) to respond to said coded "copy" input signal to produce additional blocks of machine control data corresponding to respective identified blocks of said machine control data in respective memory locations.

3. In a computer system,
(a) a manually controllable input device operable to produce coded input signals as manually selected by an operator pertaining to successive blocks of new machine control data to be generated, and
(b) a digital computer including a computer memory with memory locations for storing machine control data pertaining to positioning operations of a machine, said computer memory containing a stored program for assisting an operator in the generation of said successive blocks of new machine control data, said digital computer under the control of said stored program being responsive to said coded input signals from said input device to generate said successive blocks of new machine control data and to store said successive blocks at said memory locations of said computer memory, said digital computer under the control of said stored program being responsive to coded input signals representing respectively, displacement commands expressed incrementally from a next preceding block of said new machine control data, and displacement commands expressed as respective absolute values with respect to a common reference point to generate corresponding machine control data expressed in at least one of an incremental value from the next preceding block of machine control data and an absolute value with respect to said common reference point.

4. A computer system in accordance with claim 3 with said digital computer under the control of said stored program being operative to control print out from said memory locations of said computer, said successive blocks of new machine control data with the displacement commands of the respective blocks being expressed both as successive incremental values from respective next proceding blocks of said machine control data and as absolute values with respect to said common reference point.

5. In a computer system,
(a) a console including a manually controllable input device operable to produce a sequence of sets of function type and displacement type coded input signals as manually selected by an operator for representing a sequence of corresponding blocks of machine tool control data, each of said sets of coded input signals representing a corresponding block of machine tool function and displacement commands with respect to a predetermined type of machine tool and workpiece, and
(b) a stored program digital computer operably connectable on line with said console for receiving said coded input signals from said manually controllable input device and including a computer memory and a stored program stored in said computer memory for controlling the operation of said computer in responding to said coded input signals from said manually controllable input device,
(c) said stored program digital computer being operable under the control of said stored program to respond to each of said sets of coded input signals to generate the corresponding block of machine tool function and displacement commands, and to store said sequence of corresponding blocks at successive memory locations of said computer memory, with successive block numbers assigned thereto.

6. The computer system of claim 5 with
said console including a display device for displaying block numbers at said console and for displaying coded input signals as generated by said input device with reference to the successive block numbers, and
said stored program digital computer being operably connectable on line with said display device and being operable under the control of said stored program to generate block numbers for each of said sequence of corresponding blocks to be stored in said computer memory, and to cause said display device to display at said console the block number for the next one of said sequence of sets of coded input signals to be generated by said input device.

7. In a computer system in accordance with claim 5
said manually controllable input device being operable to generate a coded delete signal indentifying a particular series of block numbers to be deleted, and
said program digital computer being operable under the control of said stored program to respond to said coded delete signal to delete the series of blocks of machine tool control data stored in said computer memory which are identified by said particular series of block numbers identified by said coded delete signal.

8. In a computer system in accordance with claim 7,
said manually controllable input device being operable to generate said coded delete signal in response to a single character-generating manual actuation thereof, exclusive of manual actuations thereof to identify the particular series of block numbers to be deleted.

9. In a computer system in accordance with claim 5,
said manually controllable input device being operative to generate a code insert signal identifying a particular block number of a block in relation to which new blocks of machine control data are to be inserted, and
said stored program digital computer being operable under the control of said stored program to respond to said coded insert signal to insert new blocks of machine tool control data in the desired relationship to the identified block of machine tool control data already stored in said computer memory.

10. In a computer system in accordance with claim 9 said manually controllable input device being operable to generate said coded insert signal in response to a single character-generating manual actuation of said input device, exclusive of manual actuations of said input device to identify said particular block number.

11. In a computer system in accordance with claim 5, said console having a data display device for displaying blocks of machine tool control data transmitted thereto from the computer together with the assigned block numbers thereof, said data display device being operably connectable on line with said stored program digital computer, said manually controllable input device being operable to generate a coded list signal specifying a particular series of block numbers, and said stored program digital computer being operable under the control of said stored program to respond to said coded list signal from said input device to obtain from said computer memory and to transmit to said display device the series of blocks of machine tool control data to which said particular series of block numbers is assigned, for display of the series of blocks together with the assigned block numbers by said data display device at said console.

12. In a computer control system in accordance with claim 11,
said manually controllable input device being operable to generate said coded list signal in response to a single character-generating manual actuation of said input device, exclusive of the manual actuations of said input device to indentify said particular series of block numbers.

13. In a computer system in accordance with claim 5, said manually controllable input device being operable to generate a pattern type coded input signal and a particular previous block identifying signal, and said stored program digital computer being operable under the control of said stored program to respond to said pattern type coded input signal and to said particular block indentifying signal to call up from said computer memory the particular block of machine tool control data specified by said block identifying signal and to generate a new block of machine tool control data in accordance with said coded pattern type input signal and to store the new block in said computer memory, with a sequential block number assigned thereto.

14. In a computer control system in accordance with claim 13,
said manually controllable input device being operable to generate a repeat signal calling for repeated pattern type operations with respect to the particlar block identified by said block identifying signal, and said stored program digital computer under the control of said stored program being responsive to said repeat signal to place the maching tool control data generated in accordance with said coded pattern type input signal at the number of new blocks specified by said repeat signal.

15. In a computer system in accordance with claim 13,
said manually controllable input device being operable in response to a single character-generating manual actuation to generate said coded pattern type input signal, exclusive of said block indentifying signal.

16. In a computer system in accordance with claim 13,
said manually controllable input device being operable to generate pattern type coded input signals including a mirror image coded input signal together with block indentifying signals identifying a particular series of block numbers, and said stored program digital computer being operable under the control of said stored program to respond to said mirror image coded input signal to call up from said computer memory the blocks of machine tool control data having said series of block numbers to generate a new series of blocks of machine tool control data with signs of the machine tool displacement commands for at least one axis reversed, and to store the new series of blocks of machine tool control data in said computer memory with assigned sequential block numbers following the block number of the last of the blocks of machine tool control data previously stored in said computer memory.

17. In a computer system in accordance with claim 5, said console having a coded record device for producing a coded record of successive blocks of machine tool control data, said manually controllable input device being operable to generate a coded record signal together with a block identifying signal identifying a particular series of block numbers, said stored program digital computer being operably connectable on line with said coded record device to control the production of a coded record thereby, being operable under the control of said stored program to respond to said coded record signal to supply the series of blocks of machine tool control data having the particular series of block numbers identified by said block identifying signal to said coded record device for recording thereby to produce said coded record.

18. In a computer system in accordance with claim 17,
said manually controllable input device operable in response to a single character-generating manual actuation to generate said coded record signal, exclusive of said block identifying signal.

19. In a computer system in accordance with claim 5, said console including a coded record device operably connectable on line with said computer and operable for reading a coded record having successive blocks of machine tool control data recorded thereon, said manually controllable input device being operable to generate a coded read signal together with a block identifying signal specifying a series of block numbers, and said stored program digital computer being operable under the control of said stored program to respond to said coded read signal from said input device to cause said coded record device to read said coded record and to transmit to said computer the series of blocks of machine tool control data recorded on said coded record in accordance with said series of block numbers, said stored program digital computer being operable under the control of said stored program to store said series of blocks of machine tool control data from said coded record device in said computer memory with a sequence of block numbers assigned thereto.

20. In a computer system in accordance with claim 19 said coded record device being operable to read coded records having successive blocks of machine tool control data recorded thereon in two respective different formats, said manually controllable input device being operable to generate respective first and second coded read signals specifying respectively the two different formats, and said stored program digital computer being operable in response to said first and second coded read signals to receive the successive blocks of machine tool control data from said coded record device and to interpret said blocks as being in a corresponding one of said respective different formats, said computer under the control of said stored program being operable to convert successive blocks in at least one of said two formats to a different format prior to storage thereof in said computer memory.

21. In a computer system in accordance with claim 20, said manually operable input device being operable to generate said respective first and second coded read signals in response to not more than two character-generating manual actuations of said input device, exclusive of generation of said block identifying signal.

22. In a computer system in accordance with claim 5, said console having a coded record device operably connectable on line with said stored program digital computer for producing a coded record of successive blocks of machine tool control data, said manually controllable input device being operable to generate a coded initial condition signal with respect to the predetermined type of machine tool, said stored program digital computer being operable under the control of said stored program to respond to said coded initial condition signal to generate machine tool control data for placing the machine tool in an initial condition ready for a machine tool operation, including an initial displacement command and a machine tool function command for the predetermined type of machine tool, said stored program digital computer being operable to transmit to said coded record device said machine tool control data including said initial displacement command and said machine tool function command for recording on the coded record associated with said coded record device, and said stored program digital computer being responsive to a record signal to transmit to said coded record device the sequence of corresponding blocks at the successive memory locations of said computer memory for recording on the coded record subsequent to the machine tool control data generated in response to said coded initial condition signal.

23. In a computer system in accordance with claim 22, said manually operable input device being operable to generate said initial condition signal in response to a single character-generating manual actuation of said input device.

24. In a computer sytem in accordance with claim 5, said manually controllable input device being operable to generate a coded tool change signal representing a move of the workpiece to an offset position relative to a tool operating position, and said stored program digital computer being operable under the control of said stored program to respond to said coded tool change signal to compute new incremental displacement values required to move the workpiece from a present position as represented by the last of said sequence of corresponding blocks stored in said computer memory to said offset position, and to store said new incremental displacement values as a further block of machine tool control data in said computer memory.

25. In a computer system in accordance with claim 24, said manually controllable input device being operable to generate said coded tool change signal in response to a single character-generating manual actuation of said device.

26. In a computer system in accordance with claim 24, said stored program digital computer being operable under the control of said stored program to respond to a set of coded input signals from said input device subsequent to said coded tool change signal to compute incremental displacement values required to move the workpiece from said offset position to a new position as represented by the last-mentioned set of coded input signals and to store the last-mentioned incremental displacement values as a further block of machine tool control data in said computer memory.

27. In a computer system in accordance with claim 5, said manually controllable input device being operable to generate sequences of digit-representing coded input signals representing incremental displacement values along respective axes of the machine tool in relation to a next previous position of the workpiece, said stored program digital computer being operable under the control of said stored program to respond to said sequence of digit-representing coded input signals to generate corresponding blocks of machine tool control data including said incremental displacement values for the respective axes, and to calculate accumulated absolute displacement values for the respective corresponding blocks expressing displacement relative to a common reference point, and to store said corresponding blocks including said accumulated absolute displacement values in said computer memory.

28. In a computer system in accordance with claim 27, said manually controllable input device being operable to generate first and second sequences of displacement-representing coded input signals representing respectively incremental displacement values in relation to a next previous position of the workpiece, and absolute displacement values in relation to the common reference point, and said manually controllable input device being operable to signal whether a sequence of digit-representing coded input signals is a first sequence or a second sequence by means of a single character-generating manual actuation of said input device, exclusive of the manual actuations to generate said digit-representing coded input signals.

* * * * *